March 9, 1954  J. S. PAGE  2,671,682
SUCKER ROD COUPLING
Filed Oct. 19, 1951
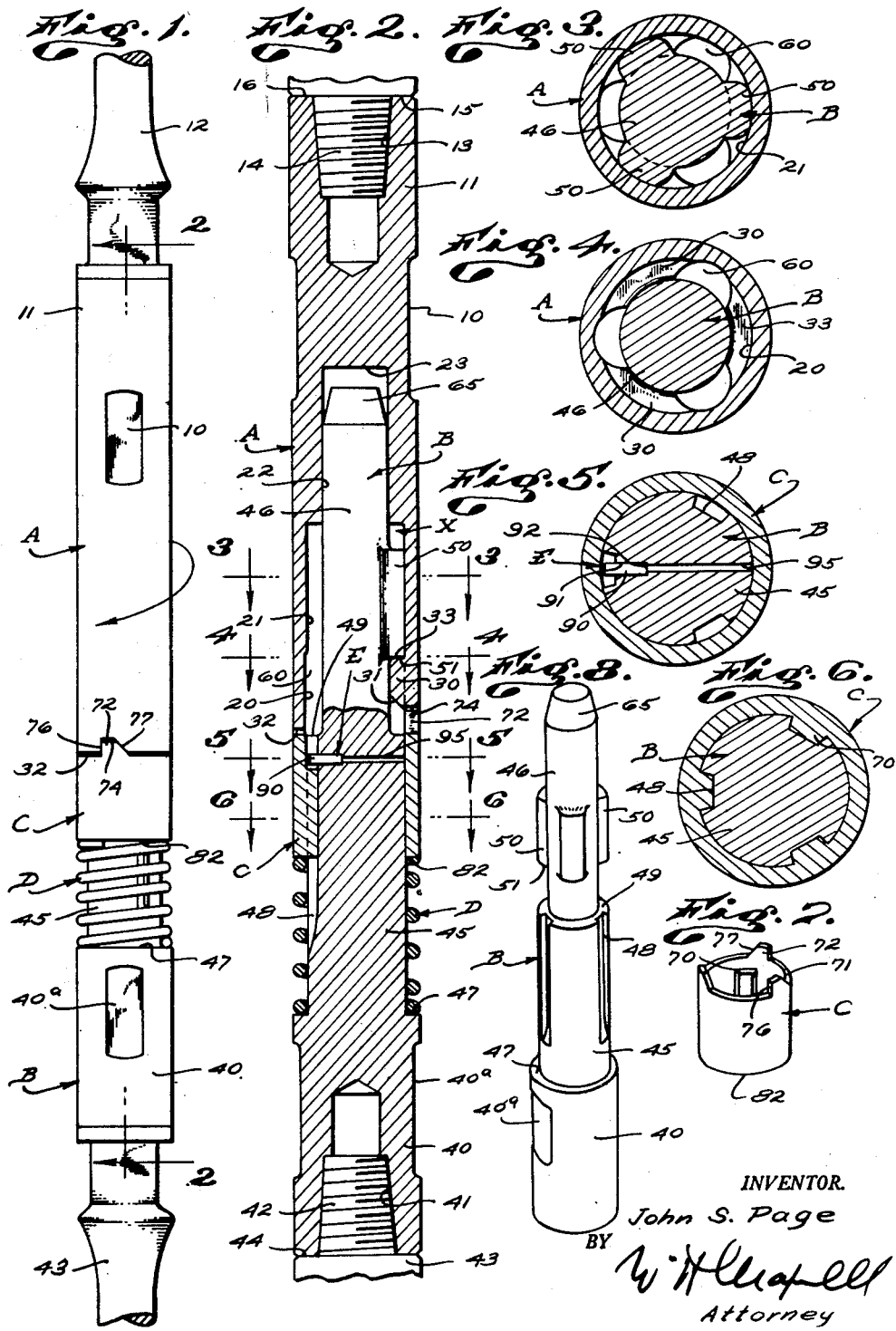
INVENTOR.
John S. Page
BY
W. H. Chapell
Attorney Patented Mar. 9, 1954

2,671,682

UNITED STATES PATENT OFFICE 2,671,682

SUCKER ROD COUPLING

John S. Page, Long Beach, Calif., assignor to Page Oil Tools Inc., Long Beach, Calif., a corporation of California Application October 19, 1951, Serial No. 252,126

3 Claims. (Cl. 287—103)

This invention has to do with a sucker rod coupling and it is a general object of the invention to provide a device of this type which is of very simple, inexpensive manufacture, which is dependable, and which is practical in operation.

Sucker rod couplings intended to be employed in sucker rods used in wells for operating pumps and the like have been provided, and structures of the general type to which this invention relates have been used with some success. In general, however, structures of this character have not always operated easily and dependably and they have in many instances been characterized by structural features which have proved to be weaknesses or difficulties and they have, in general, been rather complicated and expensive of manufacture.

It is a general object of this invention to provide a sucker rod coupling which involves few simple parts and is of such construction as to be free of any definite point of weakness where failure is likely to occur.

It is another object of the invention to provide a sucker rod coupling of the general character referred to characterized by four simple, essential elements, namely, a male section, a female section, a lock sleeve and an operating spring for the sleeve. By providing but four principal parts joints and connections are minimized and the parts are such that they can be manufactured economically and to be simple and dependable.

Another object of the invention is to provide a sucker rod coupling of the general character referred to in which the principal elements are combined or related so that upon the male and female sections being positioned for engagement relative rotation in either direction will effect the desired engagement or locking, whereas rotation in one direction, say, for instance, clockwise only, will effect release.

The structure provided by the invention includes a male section which is preferably a unitary element with the upper end portion forming a rod coupling and having a socket entering it from the lower end. The socket has a lower end portion with circumferentially spaced inwardly projecting and longitudinally disposed stop ribs. A middle portion of the socket is free and unobstructed and an upper end portion of the socket is of reduced diameter and terminates at the bottom or end of the socket which forms a stop for the male section. Tool receiving flats occur on the exterior of the female section above the socket and below the end portion that forms the coupling at which point the female section is of maximum strength.

The male section is provided at its lower end with a portion forming a rod coupling and has a body projecting up from the lower end portion, which body is round in cross section and is joined to the lower end portion by an upwardly facing shoulder. Keyways occur in the body and extend longitudinally thereof. A pin portion smaller in diameter than the body projects upwardly therefrom and is provided at its middle portion with three circumferentially spaced lugs with lower ends adapted to seat upon the upper ends of the stop ribs in the socket of the female section. The terminal or upper end portion of the pin enters the upper end portion of the socket to be slidably guided therein.

A lock sleeve slides on the body portion of the male section and has keys projecting inwardly from it to operate in the keyways of the body of the male section. Jaws project upwardly from the sleeve and enter notches in the lower end of the female section, these parts being related so that the lugs engage the notches to positively lock the female section and sleeve against relative rotation in one direction but retract to effect disengagement of the sleeve from the female section when rotational strain is applied in the opposite direction.

A helical compression spring is carried on the body of the male section between the shoulder and the sleeve and normally yieldingly urges the sleeve toward the female section.

The various objects and features of my invention will be fully understood from the following detailed description of a typical preferred form and application of the invention, throughout which description reference is made to the accompanying drawings, in which:

Fig. 1 is a side elevation of a typical embodiment of the invention showing it coupled to or connected between typical sucker rod sections. Fig. 2 is an enlarged longitudinal detailed sectional view of the structure shown in Fig. 1, being a view taken as indicated by line 2—2 on Fig. 1. Fig. 3 is an enlarged transverse sectional view taken as indicated by line 3—3 on Fig. 2. Fig. 4 is an enlarged transverse sectional view taken as indicated by line 4—4 on Fig. 2. Fig. 5 is an enlarged transverse detailed sectional view taken as indicated by line 5—5 on Fig. 2. Fig. 6 is an enlarged transverse detailed sectional view taken as indicated by line 6—6 on Fig. 2. Fig. 7 is a perspective view of the lock sleeve showing it apart from the other elements of the structure, and Fig. 8 is a perspective view of the male section, showing it apart from the other elements.

The construction embodying the present invention involves, generally, a female section A, a male section B, a lock sleeve C, a spring D operating the lock sleeve and a stop E limiting movement of the lock sleeve.

The female section A is a simple unitary elongate element which will be referred to as the upper element of the structure, although it will be apparent that the construction can be reversed end for end as circumstances may require. The female section A is round in cross section and is preferably uniform in size or diameter from one end to the other, except for diametrically opposite flattened parts or faces 10 which occur at its exterior and immediately below its upper end portion, as clearly illustrated in Figs. 1 and 2 of the drawings.

The upper end portion 11 of the female section forms a rod coupling or a part by which the female section can be connected to a sucker rod section 12. In the particular case illustrated the upper end portion 11 is provided with a threaded opening 13 receiving the projecting pin 14 of the rod section 12 while the shoulder 15 of the rod section seats against the upper end 16 of portion 11.

A socket enters the female section from its lower end and involves, generally, a lower portion 20, a middle or intermediate portion 21 and an upper portion 22. The socket terminates at an end or bottom 23 which forms a positive stop for entrance of the male section into the female section, as will be apparent from Fig. 2 of the drawings.

The lower portion 20 of the socket in the female section is round in cross section and of substantial diameter. The lower portion is interrupted by or provided with a plurality of elongate stop ribs 30 that extend longitudinally of the structure and which project radially inward from the wall of the portion 20 of the socket. In accordance with the invention I provide three stop ribs 30 and the ribs are equally spaced apart circumferentially in the socket portion 20 and the lower ends 31 of the stop ribs are spaced upwardly from the lower end 32 of the female section, and they are pitched or inclined so that they extend upwardly and inwardly as clearly illustrated in Fig. 2 of the drawings. The upper ends 33 of the stop ribs 30 are flat and in a plane normal to the longitudinal axis of the structure so that they face upwardly as shown in Fig. 2.

The middle or intermediate portion 21 of the socket continues upward from the lower portion 20 and may be of about the same diameter as portion 20 and it is a plain uninterrupted portion of the socket which is of substantial length or extent longitudinally of the structure.

The lower end portion 22 of the socket is round in cross section, coaxial with the portions 20 and 21, and it extends upwardly from the upper end of portion 21 a substantial distance in the female section to terminate at the bottom 23 of the socket. The upper end portion 22 is considerably smaller in diameter than the portion 21 that it adjoins.

It is to be observed from Fig. 2 of the drawings that the tool receiving flat parts 10 at the exterior of the female section A occur at that portion of the female section that is between the bottom 23 of the socket and the portion 11 of the female section wherein the opening 13 occurs. The portion of the body thus provided with the flat surfaces 10 is flat in cross section. Further, it is notable that the female section A of the structure, as hereinabove described, is a solid unitary or integral element so formed that it can be readily produced from a single body or bar of stock and it is wholly without joints or connections and requires no assembly or other such operations.

The male section B is a simple unitary elongate element with a lower end portion 40 forming a rod coupler and in the case illustrated the portion 40 has a threaded opening 41 adapted to receive the pin 42 of a rod section 43 so the end 44 of the rod section seats against the lower end of the male section B. The end portion 40 of the male section B is preferably provided at diametrically opposite sides with flat tool-receiving faces 40ª as shown in Figs. 2 and 8 of the drawings. The section B includes a body portion 45 that projects above or upwardly from the portion 40 and it has a pin portion 46 that projects up from the body 45.

The body portion 45 of pin section B is somewhat smaller in diameter than the end portion 40 and where these parts join there is an upwardly facing shoulder 47. The body portion 45 is of substantial length and it is provided with a plurality of circumferentially spaced longitudinal keyways 48 entering the body portion 45 from its upper end 49 and extending downwardly a substantial distance, as clearly shown in Fig. 8 of the drawings. It is to be observed from the drawings that the body portion 45 is round or turned and is of uniform diameter throughout its length.

The pin portion 46 of the male section B is considerably smaller in diameter than the body portion and projects upward from the upper end 49 of the body section. The pin portion 46 is of substantial length and is provided on its exterior and on its intermediate portion with a plurality of circumferentially spaced lugs 50. The lugs are integral with the pin portion 46 and project radially outward therefrom and they have flat downwardly facing lower ends 51 which are adapted to be arranged to seat on the upper ends 33 of the stop ribs 30. The lower ends 51 of the lugs 50 are spaced a substantial distance above the upper end 49 of the body portion 45 so that the stop ribs 30 are accommodated between the lugs and the upper end 49 of the body, as shown in Fig. 2 of the drawings. The lugs 50 extend a substantial distance lengthwise of the pin portion 46 and terminate short of the upper end of the socket portion 21 providing clearance between the lugs and the upper end of socket portion 41, as shown at X when the lugs are seated upon the stop ribs 30.

The pin portion 46 continues a substantial distance above the lugs 50 and this upper part of the pin portion is slidably received in the upper portion 22 of the socket provided in the female section, as clearly shown in Fig. 2 of the drawings. It is to be observed that the lugs 50 provided on pin portion 46 correspond in number and arrangement with the stop ribs 30 in the socket portion 20, and it is further to be observed that the lugs 50 are of such extent circumferentially of the pin section as to be received in the openings 60 that occur between the stop ribs 30 when the male section is rotated to a position relative to the female section where the lugs and stop ribs are out of register or engagement. In the preferred construction the tip or terminal end portion 65 of the portion 46 of the male section is tapered or upwardly convergent so that it will readily enter or feed into the socket when the male and female sections are fed together, as when the male section is in a well and facing upwardly and the female section is lowered onto the male section.

The lock sleeve C is an elongate tubular part slidably mounted on or carried by the body portion 45 of the male section. The lock sleeve is provided at its interior with keys 70 which extend longitudinally of the sleeve and which are slidably engaged in the keyways 48 occurring in the body portion 45 of the male section. Through this construction the lock sleeve is slidably keyed to the body 45.

The lock sleeve C is provided at its upper end 71 with a plurality of jaws 72 which are circumferentially spaced apart around the upper end of the sleeve. In the case illustrated there are three like jaws 72 and the lower end 32 of the female section A is provided with notches or recesses 74 corresponding in size, shape and arrangement with the jaws to receive the jaws, as illustrated in Fig. 1 of the drawings. In the preferred form of the invention the front face 76 of each jaw 72 is flat and extends longitudinally of the structure, whereas the back face 77 is inclined or pitched. The walls of the recesses 74 are disposed to correspond with the faces of the jaws, as will appear from Fig. 1 of the drawings. With this construction when the jaws are engaged in the recesses 74, as shown in Fig. 1, the lock sleeve which is keyed to the male section against rotation relative thereto is engaged with the female section A so that torsion applied to the female section in a clockwise direction, as indicated by the arrow in Fig. 1, will cause cooperation between the beveled or inclined faces of the lugs and the corresponding walls of the recesses, resulting in movement of the lock sleeve lengthwise of the male section until the lock sleeve is disengaged from the female section, whereas, if the female section is rotated in the opposite or in a counter-clockwise direction there will be positive rotation of the male section with the female section and no disengagement of the lock sleeve from the female section.

The spring D is a helical compression spring carried on the body portion 45 between the lower end 82 of the sleeve C and the shoulder 47, as clearly illustrated in Figs. 1 and 2 of the drawings. The spring D is normally under compression and yieldingly urges the lock sleeve C upwardly so that when the male and female sections are engaged, as shown in Figs. 1 and 2, the lock sleeve is maintained in the locking position where the jaws 72 are engaged in the recesses 74.

The stop E, as provided by the present invention, is a simple stop pin 90 carried in an opening or bore 91 entering the body portion 45 of the male section from the bottom of one of the keyways 48 at the upper end portion thereof. The pin 90 is of such length that when it is seated against the bottom 92 of the bore 91 it projects into the said keyway and thus forms a positive stop which is engaged by the key 70 that operates in that keyway. The parts are preferably related so that the upper end of the said key stops the upward movement of the lock sleeve on the body portion 45 of the male section, so that the lock sleeve does not become displaced from the body portion when the structure is released, allowing the female section to be lifted away from or off of the male section. In the preferred construction a reduced bore or opening 95 continues from the bottom of the opening 90 diametrically through the body portion 45 to the opposite side of the body portion and thus provides an opening to receive a tool when it is necessary to drive or force the pin out of the opening 91. Normally, when the lock sleeve is in operating position the lock sleeve covers or engages over the outer end of the pin 90, preventing displacement of the pin from the opening 91. To introduce the pin into the opening 91 or to remove it therefrom, the lock sleeve is moved downwardly against the resistance of the spring until the opening 91 is uncovered.

From the foregoing description it will be apparent that with the construction of the present invention the male section B may be on a pump or on a sucker rod section so that it projects upwardly and when the female section A is lowered over the male section the pin portion of the male section leads the male section into the socket in the female section and by slight rotation in one direction or the other the lugs 50 are positioned to pass between the stop ribs 30 with the result that the male section becomes fully engaged in the socket in the female section with the lugs above the stop ribs. With the parts thus positioned rotation of one section or the other, for instance, of the female section relative to the male section, in either direction will bring the lower ends 51 of the lugs into seated engagement with the tops 33 of the stop ribs and when full register of these parts occurs the jaws 72 on the lock sleeve become registered with and enter the recesses 74 in the lower end of the female section. With the lock sleeve engaged the male and female sections are locked against relative rotation, being positively locked against relative rotation in one direction and yieldingly locked against relative rotation in the opposite direction.

Through the construction hereinabove described the present invention provides a coupling which can be easily and dependably engaged and which is secure and effective when once set. Further, by providing a structure wherein there are three stop ribs 30 and three corresponding lugs 50, the male and female sections are engaged or coupled so that there is no rocking between these sections even though there is a suitable working clearance provided between the parts that must be engaged with each other.

Having described only a typical preferred form and application of my invention, I do not wish to be limited or restricted to the specific details herein set forth, but wish to reserve to myself any variations or modification that may appear to those skilled in the art and fall within the scope of the following claims.

Having described my invention, I claim:

1. A rod coupling including, an elongate female section with an upper end portion adapted to connect with a rod and having a socket entering it from the lower end, the socket having a lower portion with a plurality of circumferentially spaced stop ribs therein, having a plain middle portion above the lower portion and having an upper portion above and smaller in diameter than the middle portion, a male section with a lower end portion adapted to connect with a rod, having a body projecting up from the lower end portion and having a pin portion smaller in diameter than the body and projecting upward therefrom, there being a shoulder between the lower end portion and the body, the body having a longitudinal keyway therein, the pin portion having a plurality of circumferentially spaced lugs thereon slidable between the ribs and engageable with the tops of the ribs, the upper end portion of the pin portion being plain and slidable in the upper portion of the socket, a lock sleeve slidable on the body and having a key slidable in the keyway, jaws on the upper end of the sleeve, there being recesses in the lower end of the female section adapted to receive the jaws when the lugs engage the top of the ribs, and a helical compression spring on the body engaging the shoulder and engaging the lower end of the sleeve to normally yieldingly urge the sleeve toward the lower end of the female section, each jaw having a front face extending substantially straight lengthwise of the coupling and having an inclined rear face and the recesses having walls corresponding to the faces of the jaws whereby the rotary drive between the female section and the sleeve is positive in one direction and is adapted to yield under predetermined torque in the other direction.

2. A rod coupling including, an elongate female section with an upper end portion adapted to connect with a rod and having a socket entering it from the lower end, the socket having a lower portion with a plurality of circumferentially spaced stop ribs therein, having a plain middle portion above the lower portion and having an upper portion above and smaller in diameter than the middle portion, a male section with a lower end portion adapted to connect with a rod, having a body projecting up from the lower end portion and having a pin portion smaller in diameter than the body and projecting upward therefrom, there being a shoulder between the lower end portion and the body, the body having a longitudinal keyway therein, the pin portion having a plurality of circumferentially spaced lugs thereon slidable between the ribs and engageable with the tops of the ribs, the upper end portion of the pin portion being plain and slidable in the upper portion of the socket, a lock sleeve slidable on the body and having a key slidable in the keyway, jaws on the upper end of the sleeve, there being recesses in the lower end of the female section adapted to receive the jaws when the lugs engage the top of the ribs, and a helical compression spring on the body engaging the shoulder and engaging the lower end of the sleeve to normally yieldingly urge the sleeve toward the lower end of the female section, the lower ends of the ribs being inclined upwardly and inwardly, and the upper terminal end part of the pin portion being upwardly and inwardly tapered, each jaw having a front face extending substantially straight lengthwise of the coupling and having inclined rear faces and the recesses having walls corresponding to the faces of the jaws whereby the rotary drive between the female section and the sleeve is positive in one direction and is adapted to yield under predetermined torque in the other direction.

3. A rod coupling including, an elongate female section with an upper end portion adapted to connect with a rod and having a socket entering it from the lower end, the socket having a lower portion with a plurality of circumferentially spaced stop ribs therein, having a plain middle portion above the lower portion and having an upper portion above and smaller in diameter than the middle portion, a male section with a lower end portion adapted to connect with a rod, having a body projecting up from the lower end portion and having a pin portion smaller in diameter than the body and projecting upward therefrom, there being a shoulder between the lower end portion and the body, the body having a longitudinal keyway therein, the pin portion having a plurality of circumferentially spaced lugs thereon slidable between the ribs and engageable with the tops of the ribs, the upper end portion of the pin portion being plain and slidable in the upper portion of the socket, a lock sleeve slidable on the body and having a key slidable in the keyway, jaws on the upper end of the sleeve, there being recesses in the lower end of the female section adapted to receive the jaws when the lugs engage the top of the ribs, a helical compression spring on the body engaging the shoulder and engaging the lower end of the sleeve to normally yieldingly urge the sleeve toward the lower end of the female section, and a stop pin carried by the body and projecting laterally therefrom and into the keyway to be normally within the sleeve to be engaged by the key to limit upward movement of the sleeve on the body, each jaw having a front face extending substantially straight lengthwise of the coupling and having an inclined rear face and the recess having walls corresponding to the faces of the jaws whereby the rotary drive between the female section and the sleeve is positive in one direction and is adapted to yield under predetermined torque in the other direction, and the female section having a solid portion with tool receiving faces and located between the upper end portion and the bottom of the socket.

JOHN S. PAGE.

References Cited in the file of this patent

UNITED STATES PATENTS

| Number | Name | Date |
|---|---|---|
| 1,645,802 | Davis | Oct. 18, 1927 |
| 2,092,060 | Gairing | Sept. 7, 1937 |
| 2,321,215 | Lee | June 8, 1943 |